US012802989B2

(12) United States Patent
Yamamura et al.

(10) Patent No.: US 12,802,989 B2
(45) Date of Patent: Nov. 17, 2026

(54) NEGATIVE ELECTRODE MIXTURE FOR SODIUM ION BATTERY, AND SODIUM ION BATTERY AND METHOD FOR MANUFACTURING THEREOF

(71) Applicant: TOYOTA JIDOSHA KABUSHIKI KAISHA, Aichi-ken (JP)

(72) Inventors: Hideyuki Yamamura, Susono (JP); Hiroshi Suyama, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 137 days.

(21) Appl. No.: 18/942,779

(22) Filed: Nov. 11, 2024

(65) Prior Publication Data

US 2025/0158064 A1 May 15, 2025

(30) Foreign Application Priority Data

Nov. 15, 2023 (JP) ................................ 2023-194532

(51) Int. Cl.

| | |
|---|---|
| ***H01M 4/62*** | (2006.01) |
| ***H01B 1/04*** | (2006.01) |
| ***H01M 4/04*** | (2006.01) |
| ***H01M 4/133*** | (2010.01) |
| ***H01M 4/1393*** | (2010.01) |

(Continued)

(52) U.S. Cl.

CPC ................ *H01M 4/62* (2013.01); *H01B 1/04* (2013.01); *H01M 4/0404* (2013.01); *H01M 4/133* (2013.01); *H01M 4/1393* (2013.01); *H01M 4/587* (2013.01); *H01M 10/054* (2013.01); *H01M 2004/027* (2013.01)

(58) Field of Classification Search

CPC .. H01B 1/00; H01B 1/04; H01M 4/14; H01M 4/62; H01M 10/054

See application file for complete search history.

(56) References Cited

U.S. PATENT DOCUMENTS

| | | | | |
|---|---|---|---|---|
| 9,991,491 | B2 * | 6/2018 | Lee ..................... | H01M 4/0404 |
| 10,177,370 | B2 * | 1/2019 | Kawai ............... | H01M 10/0525 |

(Continued)

FOREIGN PATENT DOCUMENTS

| | | | |
|---|---|---|---|
| CN | 102201565 B | * | 11/2013 |
| CN | 108878805 A | * | 11/2018 |

(Continued)

*Primary Examiner* — Mark Kopec

(74) *Attorney, Agent, or Firm* — HAUPTMAN HAM, LLP

(57) ABSTRACT

The present disclosure provides a negative electrode mixture for a sodium ion battery that can improve charge capacity and discharge capacity, and charge-discharge efficiency, a sodium ion battery comprising such a negative electrode mixture, and a method for manufacturing thereof. The negative electrode mixture for a sodium ion battery of the present disclosure comprises a negative electrode active material and zirconium oxide, wherein the negative electrode active material comprises hard carbon, and a ratio of a mass of the zirconium oxide relative to a total mass of the hard carbon and the zirconium oxide is 1% by mass or more and 20% by mass or less. The sodium ion battery 1 of the present disclosure comprises a negative electrode active material layer 20, and the negative electrode active material layer 20 comprises a negative electrode mixture of the present disclosure.

8 Claims, 3 Drawing Sheets

(51) Int. Cl.

| | |
|---|---|
| ***H01M 4/587*** | (2010.01) |
| ***H01M 10/054*** | (2010.01) |
| *H01M 4/02* | (2006.01) |

(56) References Cited

U.S. PATENT DOCUMENTS

| | | | | |
|---|---|---|---|---|
| 2010/0124700 | A1 * | 5/2010 | Schaefer ............. | H01M 50/457 429/231.95 |
| 2012/0015256 | A1 | 1/2012 | Komaba et al. | |

FOREIGN PATENT DOCUMENTS

| | | | | |
|---|---|---|---|---|
| CN | 111048756 | A | * | 4/2020 |
| CN | 113471404 | A | * | 10/2021 |
| CN | 114975929 | A | * | 8/2022 |
| CN | 116825960 | A | | 9/2023 |
| CN | 118448591 | A | * | 8/2024 |
| CN | 114792782 | B | * | 2/2025 |
| JP | 2013-229319 | A | | 11/2013 |
| JP | 2017-174664 | A | | 9/2017 |
| KR | 20070034224 | A | * | 3/2007 |
| WO | 2010/109889 | A1 | | 9/2010 |

* cited by examiner

NEGATIVE ELECTRODE MIXTURE FOR SODIUM ION BATTERY, AND SODIUM ION BATTERY AND METHOD FOR MANUFACTURING THEREOF

RELATED APPLICATIONS

The present application claims priority of Japanese Patent Application No. 2023-194532 filed Nov. 15, 2023, the disclosure of which is hereby incorporated by reference herein in its entirety.

FIELD

The present disclosure relates to a negative electrode mixture for a sodium ion battery, and a sodium ion battery and a method for manufacturing thereof.

BACKGROUND

Lithium ion batteries are used as power sources for mobile devices and automobiles, taking advantage of their high capacity and light weight characteristics. On the other hand, in recent years, sodium ion batteries using sodium have been attracting attention as a material replacing lithium from the viewpoint of resources.

For example, PTL 1 discloses a sodium ion secondary battery comprising a positive electrode, a negative electrode having a negative electrode active material, and a non-aqueous electrolytic solution comprising a non-aqueous solvent, wherein the negative electrode active material is a hard carbon.

PTL 2 discloses an electrode for a sodium secondary battery having an electrode mixture layer comprising an electrode active material and a binder comprising a polycarboxylic acid and/or a polycarboxylic acid alkali metal salt.

CITATION LIST

Patent Literature

[PTL 1] PCT International Publication No. WO 2010/109889

[PTL 2] Japanese Unexamined Patent Publication (Kokai) No. 2013-229319

SUMMARY

Technical Problem

In sodium ion batteries, there is room for improvement in charge capacity and discharge capacity, and charge-discharge efficiency.

An object of the present disclosure is to provide a negative electrode mixture for a sodium ion battery that can improve charge capacity and discharge capacity, and charge-discharge efficiency, a sodium ion battery comprising such a negative electrode mixture, and a method for manufacturing thereof.

Solution to Problem

The present inventors have discovered that the above object can be achieved by the following means.

<Aspect 1>

A negative electrode mixture for a sodium ion battery, wherein the negative electrode mixture for a sodium ion battery comprises a negative electrode active material, and zirconium oxide, wherein the negative electrode active material comprises hard carbon, and wherein a ratio of a mass of the zirconium oxide relative to a total mass of the hard carbon and the zirconium oxide is 1% by mass or more and 20% by mass or less.

<Aspect 2>

A sodium ion battery, wherein the sodium ion battery comprises a negative electrode active material layer, and wherein the negative electrode active material layer comprises the negative electrode mixture according to Aspect 1.

<Aspect 3>

A method for manufacturing a sodium ion battery, wherein the method for manufacturing a sodium ion battery comprises forming a negative electrode active material layer, and wherein the negative electrode active material layer comprises the negative electrode mixture according to Aspect 1.

<Aspect 4>

A method according to Aspect 3, comprising forming the negative electrode active material layer by a method comprising the following steps:

providing a negative electrode mixture slurry comprising a negative electrode mixture according to Aspect 1 and a dispersion medium; and applying the negative electrode mixture slurry to a base material, and drying and removing the dispersion medium.

Advantageous Effects of Invention

In accordance with the present disclosure, a negative electrode mixture for a sodium ion battery that can improve charge capacity and discharge capacity, and charge-discharge efficiency, a sodium ion battery comprising such a negative electrode mixture, and a method for manufacturing thereof can be provided.

DESCRIPTION OF EMBODIMENTS

Figure 1:
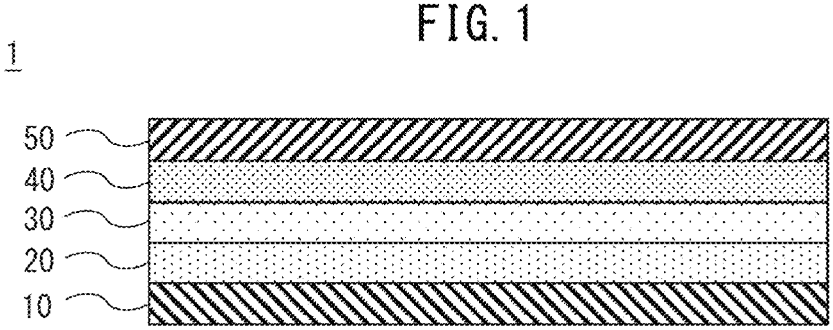
FIG. 1 is a schematic cross-sectional view showing an example of a sodium ion battery of the present disclosure.
Figure 2:
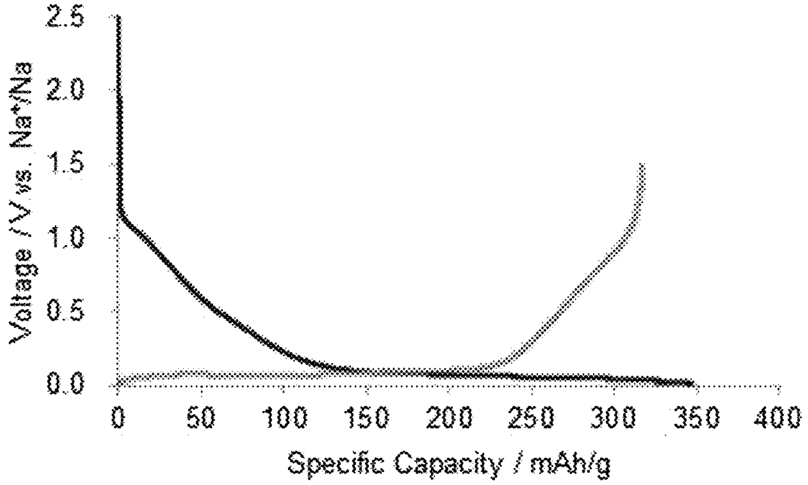
FIG. 2 is a graph showing the charge-discharge curve (current value: 0.1 C) of the cell of Example 3.
Figure 3:
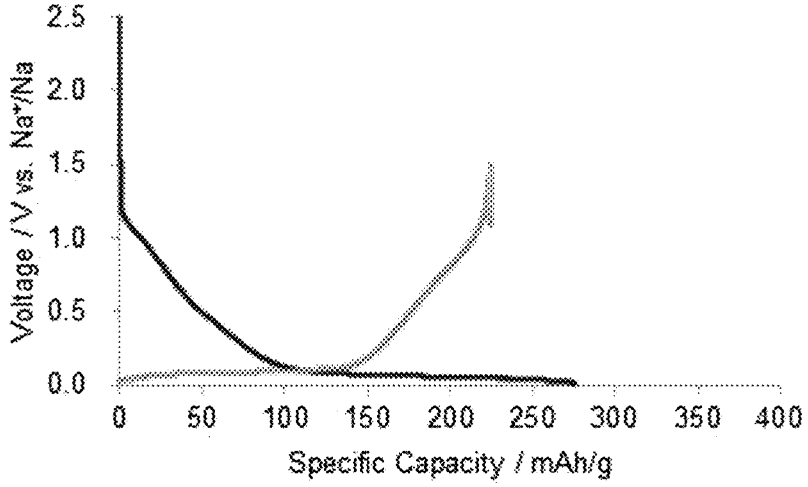
FIG. 3 is a graph showing the charge-discharge curve (current value: 0.3 C) of the cell of Example 3.
Figure 4:
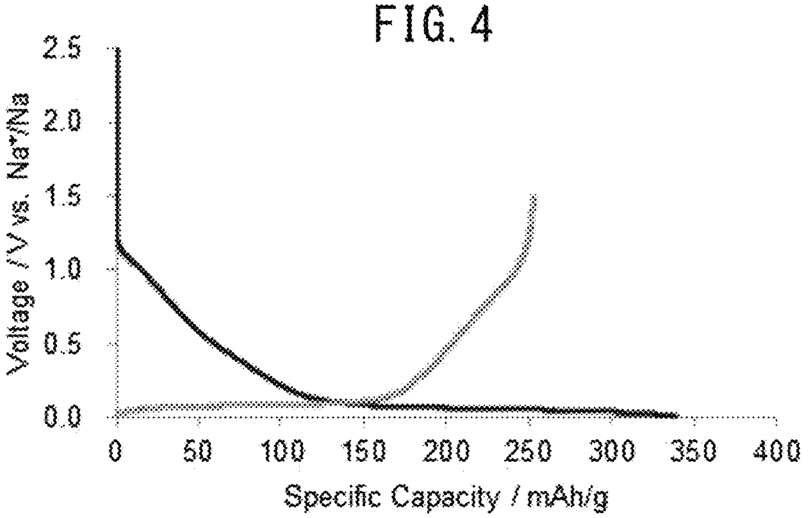
FIG. 4 is a graph showing the charge-discharge curve (current value: 0.1 C) of the electrochemical cell in Example 1.
Figure 5:
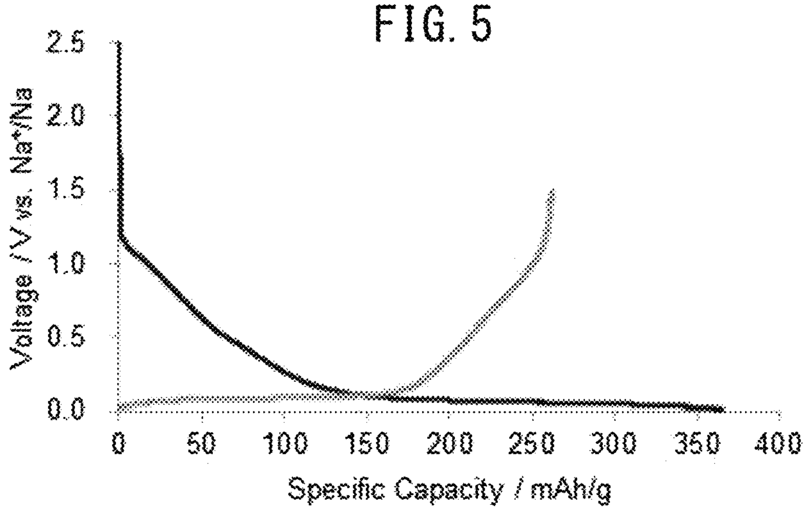
FIG. 5 is a graph showing the charge-discharge curve (current value: 0.1 C) of the electrochemical cell in Example 2.
Figure 6:
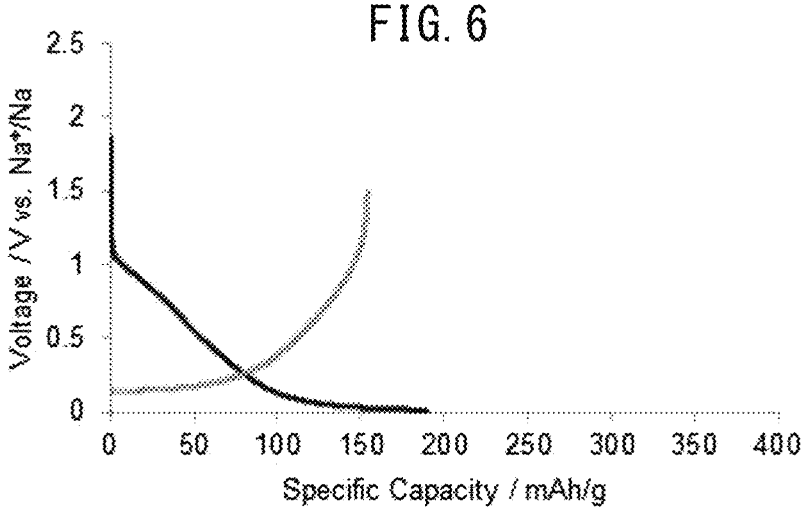
FIG. 6 is a graph showing the charge-discharge curve (current value: 0.3 C) of the electrochemical cell in Comparative Example 1.
Figure 7:
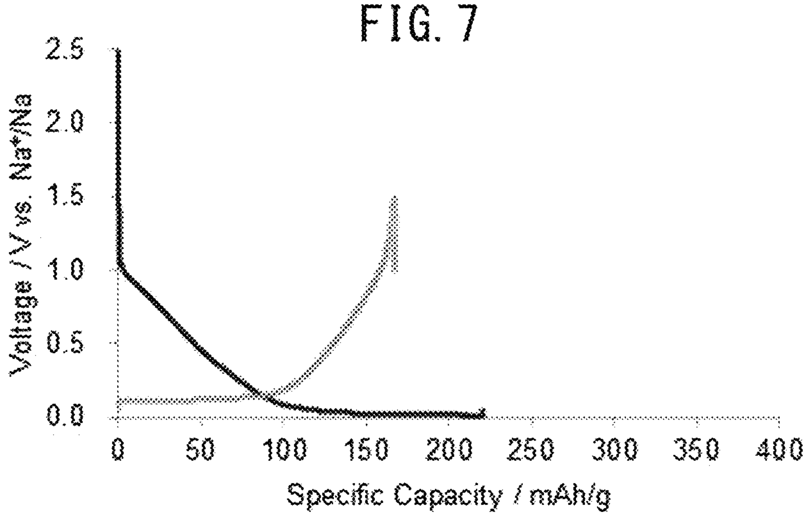
FIG. 7 is a graph showing the charge-discharge curve (current value: 0.3 C) of the electrochemical cell in Comparative Example 2.
Figure 8:
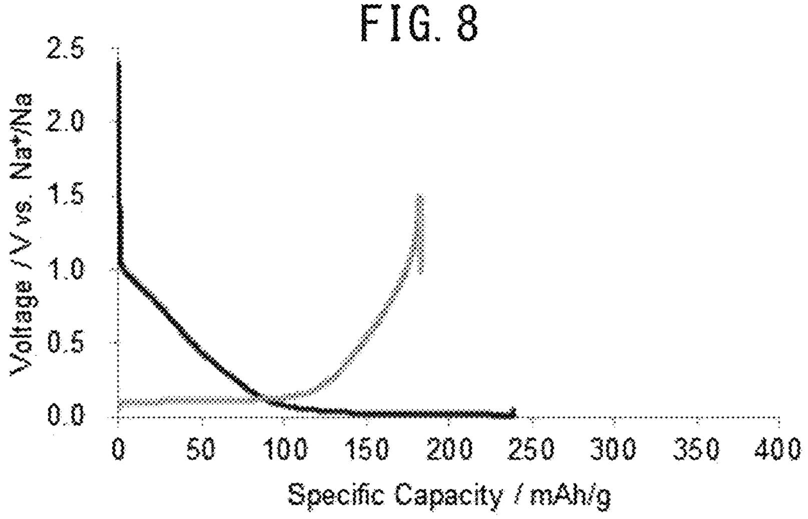
FIG. 8 is a graph showing the charge-discharge curve (current value: 0.3 C) of the electrochemical cell in Comparative Example 3.
Figure 9:
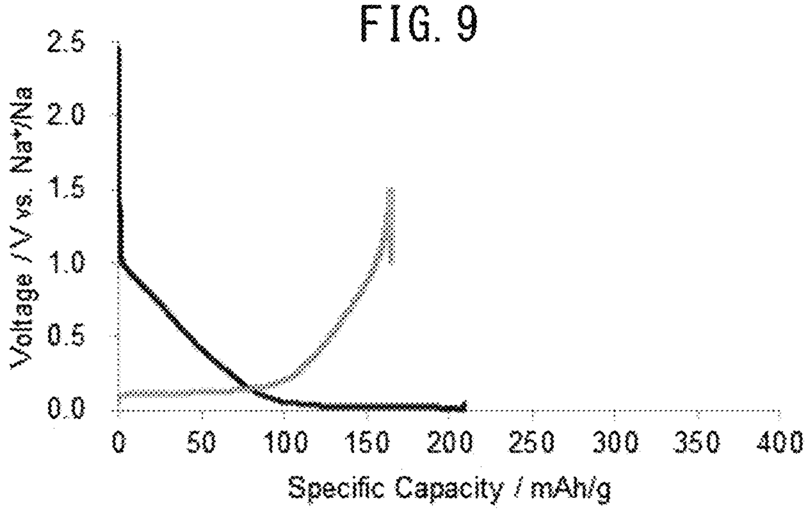
FIG. 9 is a graph showing the charge-discharge curve (current value: 0.3 C) of the electrochemical cell in Comparative Example 4.

Hereinafter, embodiments of the present disclosure will be described in detail. It should be noted that the present disclosure is not limited to the following embodiments, and thus various modifications can be made thereto within the scope of the disclosure.

<<Negative Electrode Mixture for Sodium Ion Battery>>

The negative electrode mixture for a sodium ion battery of the present disclosure comprises a negative electrode active material and zirconium oxide, wherein the negative electrode active material comprises hard carbon, and a ratio of a mass of the zirconium oxide relative to a total mass of the hard carbon and the zirconium oxide is 1% by mass or more and 20% by mass or less.

Although not limited to theory, in a sodium ion battery comprising a negative electrode mixture having such a configuration, charge capacity and discharge capacity, and charge-discharge efficiency, specifically, charge-discharge properties, are improved by zirconium oxide facilitating the insertion and desorption of sodium into hard carbon.

The "negative electrode mixture" relating to the present disclosure means a composition that can constitute a negative electrode active material layer as-is or by further comprising additional components. Further, the "negative electrode mixture slurry" relating to the present disclosure means a slurry that comprises a dispersion medium in addition to the "electrode mixture" and can thereby be applied and dried to form a negative electrode active material layer.

The negative electrode mixture for a sodium ion battery of the present disclosure comprises a negative electrode active material and zirconium oxide, and may optionally comprise a conductive aid and a binder.

<Negative Electrode Active Material>

The negative electrode active material comprises hard carbon. The negative electrode mixture of the present disclosure may comprise a negative electrode active material in an amount of, for example, 50% by mass or more or 70% by mass or more, and 99% by mass or less or 95% by mass or less. The content of the hard carbon relative to the total amount of the negative electrode active material may be 50% by mass or more, 70% by mass or more, 90% by mass or more, 95% by mass or more, or 99% by mass or more, and may be 100% by mass. In other words, the negative electrode active material may be hard carbon. The average particle size of the hard carbon is not particularly limited, but can be, for example, in the range of 50 nm to 100 μm.

Hard carbon can be produced, for example, by carbonizing a raw material comprising a carbon element. The carbonization temperature may be, for example, about 1000° C. to 2000° C. Further, carbonization can be performed under an inert atmosphere. The raw material of the hard carbon is not particularly limited, as long as it is a raw material capable of producing hard carbon.

For example, organic compounds such as alcohols such as ethanol, phenols, or aldehydes such as formaldehyde can be used as a raw materials. In addition, resins such as phenol resin, polyacrylonitrile, or polyimide can be used as raw materials. These raw materials may be used alone or as a mixture of a plurality of types.

<Zirconium Oxide>

The ratio of a mass of the zirconium oxide relative to a total mass of the hard carbon and the zirconium oxide is 1% by mass or more and 20% by mass or less. The range of this ratio may differ according to the current value assumed in charging and discharging a sodium ion battery comprising the negative electrode mixture of the present disclosure.

For example, when the above current value is 0.1C, this ratio may be 6% by mass or more, 7% by mass or more, 8% by mass or more, 9% by mass or more, or 10% by mass or more, and may be 18% by mass or less, 15% by mass or less, 13% by mass or less, 12% by mass or less, 11% by mass or less, or 10% by mass or less. For example, when the above current value is 0.3C, this ratio may be 2% by mass or more, 3% by mass or more, 4% by mass or more, 5% by mass or more, 6% by mass or more, 7% by mass or more, 8% by mass or more, 9% by mass or more, or 10% by mass or more, 18% by mass or less, 15% by mass or less, 13% by mass or less, 12% by mass or less, 11% by mass or less, or 10% by mass or less. In other words, when a sodium ion battery comprising the negative electrode mixture of the present disclosure is used in applications where the battery is charged and discharged at a lower current value, the charge-discharge properties of the battery can be improved, even when a smaller amount of zirconium oxide is included.

<Conductive Aid>

The conductive aid may be, for example, a carbon material, a metal material, or the like. Specific examples of the carbon material comprise carbon black such as acetylene black, Ketjen black, furnace black, and thermal black; carbon fibers such as VGCF; graphite; hard carbon; coke; and the like. The metallic material may comprise Fe, Cu, Ni, Al and the like. The content of the conductive aid in the negative electrode mixture is not particularly limited. For example, the negative electrode mixture may comprise the conductive aid in an amount of 1% by mass or more and 50% by mass or less.

<Binders>

As the binder, a chemically and electrically stable binder may be used. Specific examples of the binder comprise a fluorine-based binder such as a polyvinylidene fluoride (PVdF) based binder and a polytetrafluoroethylene (PTFE) based binder, a rubber-based binder such as a styrene-butadiene rubber (SBR) based binder, an olefinic binder such as a polypropylene (PP) based binder and a polyethylene (PE) based binder, a cellulose-based binder such as a carboxymethylcellulose (CMC) based binder, or a polyacrylic acid (PAA) based binder. The content of the binder in the negative electrode mixture is not particularly limited, and may be appropriately determined, depending on the desired binding property.

<<Sodium Ion Battery>>

As shown in FIG. 1, the sodium ion battery 1 of the present disclosure comprises a negative electrode active material layer 20, and the negative electrode active material layer 20 comprises a negative electrode mixture of the present disclosure. The sodium ion battery of the present disclosure may comprise a negative electrode current collector 10, a negative electrode active material layer 20, a separator 30, a positive electrode current collector 40, and a positive electrode active material layer 50 in this order, and these may be impregnated with an electrolytic solution.

<Negative Current Collector>

Examples of the material for the negative electrode current collector comprise SUS, aluminum, copper, nickel, and carbon.

The negative electrode current collector may be, for example, a foil shape, a mesh shape, or a porous shape.

<Negative Electrode Active Material Layer>

The negative electrode active material layer comprises a negative electrode mixture of the present disclosure. For the negative electrode mixture of the present disclosure, the above description relating to the negative electrode mixture of the present disclosure can be referred to.

The negative electrode active material layer may have a constant thickness. The thickness of the negative electrode active material layer is not particularly limited, but may be, for example, 0.1 μm or more and 1 mm or less.

<Separator>

The material for the separator is not particularly limited as long as it has a function of electrically separating the negative electrode active material layer and the positive electrode active material layer, but examples thereof comprise porous sheets made of resins such as polyethylene (PE), polypropylene (PP), polyester, cellulose, or polyamide; porous insulating materials such as nonwoven fabrics or glass fiber nonwoven fabrics; or combinations thereof. The thickness of the separator is not particularly limited, and may be, for example, 5 μm or more and 1 mm or less. The separator also functions as an electrolyte layer by being impregnated into an electrolytic solution.

<Electrolytic Solution>

The electrolytic solution may comprise a sodium salt and a non-aqueous solvent. Examples of the sodium salt may comprise inorganic sodium salts such as $NaPF_6$, $NaBF_4$, $NaClO_4$ and $NaAsF_6$; and organic sodium salts such as $NaCF_3SO_3$, $NaN(CF_3SO_2)_2$, $NaN(C_2F_5SO_2)_2$, $NaN(FSO_2)_2$, $NaC(CF_3SO_2)_3$.

The non-aqueous solvent is not particularly limited as long as it dissolves the sodium salt. Examples of the high dielectric constant solvent comprise cyclic esters (cyclic carbonates) such as ethylene carbonate (EC), propylene carbonate (PC), and butylene carbonate (BC), γ-butyrolactone, sulfolane, N-methyl-2-pyrrolidone (NMP), 1,3-dimethyl-2-imidazolidinone (DMI), and the like. On the other hand, examples of the low viscosity solvent comprise chain esters (chain carbonates) such as dimethyl carbonate (DMC), diethyl carbonate (DEC), and ethyl methyl carbonate (EMC); acetates such as methyl acetate and ethyl acetate; and ethers such as 2-methyltetrahydrofuran. As the non-aqueous solvent, a mixed solvent obtained by mixing a high dielectric constant solvent and a low viscosity solvent may be used.

<Positive Electrode Active Material Layer>

The positive electrode active material layer comprises a positive electrode active material, and may optionally comprise a conductive aid and a binder.

Examples of the positive electrode active material comprise Na-comprising oxides such as layered active materials, spinel-type active materials, and olivine-type active materials. Specifically, examples of the positive electrode active material comprise such as $NaFeO_2$, $NaNiO_2$, $NaCoO_2$, $NaMnO_2$, $NaVO_2$, $Na(Ni_xMn_{1-x})O_2 (0<X<1)$, $Na(Fe_xMn_{1-x})O_2$ $(0<X<1)$, $NaVPO_4F$, $Na_2FcPO_4F$, $Na_3V_2(PO_4)_3$. The shape of the positive electrode active material is not particularly limited. The positive electrode active material may be particulate. In this case, the average particle size may be, for example, 1 nm or more or 10 nm or more, and may be 100 μm or less or 30 μm or less. As the content of the positive electrode active material in the positive electrode active material layer increases, the capacity of the positive electrode increases. The positive electrode active material layer may comprise the positive electrode active material in an amount of, for example, 50% by mass or more or 70% by mass or more, and 99% by mass or less or 95% by mass or less.

For the conductive aid and the binder, the above description relating to the negative electrode mixture for a sodium ion battery of the present disclosure can be referred to.

The positive electrode active material layer may have a constant thickness. The thickness of the positive electrode active material layer is not particularly limited, but may be, for example, 0.1 μm or more and 1 mm or less.

<Positive Electrode Current Collector>

Examples of the material for the positive electrode current collector comprise SUS, aluminum, nickel, iron, titanium, and carbon.

The positive electrode current collector may be, for example, a foil shape, a mesh shape, or a porous shape.

<Other Configurations>

The sodium ion battery of the present disclosure may comprise a battery case, which houses each layer of the battery, and a terminal connected to a current collector. The sodium ion battery of the present disclosure may also comprise a restraining member that restrains each layer along the laminated direction to reduce contact resistance. For these, the same ones as conventional ones may be used.

Examples of the shape of the sodium ion battery of the present disclosure comprise a coin form, a laminate form, a cylindrical form, and an angular form.

<<Method for Manufacturing Sodium Ion Battery>>

The method of the present disclosure for manufacturing a sodium ion battery comprises forming a negative electrode active material layer, and wherein the negative electrode active material layer comprises a negative electrode mixture of the present disclosure.

The method of the present disclosure may comprise forming a negative electrode active material layer by a method comprising the following steps: providing a negative electrode mixture slurry comprising a negative electrode mixture of the present disclosure and a dispersion medium, and applying the negative electrode mixture slurry to a substrate and drying and removing the dispersion medium.

For the negative electrode mixture of the present disclosure, the above description relating to the negative electrode mixture of the present disclosure can be referred to.

The dispersion medium is not particularly limited, and examples thereof comprise alcohols, glycols, cellosolves, amines, ketones, carboxylic acid amides, phosphoric acid amides, sulfoxides, carboxylic acid esters, phosphoric acid esters, ethers, and nitriles. Specific examples thereof comprise ethanol, 2-propanol, methyl ethyl ketone, and N-methyl-2-pyrrolidone.

The base material is not particularly limited, but may be, for example, a negative electrode current collector.

The drying temperature, the drying time, and the like can be appropriately designed depending on the boiling point and the amount used of the dispersion medium.

EXAMPLES

Example 1

<Manufacture of Cell for Evaluation>

(Preparation of Negative Electrode Mixture)

A mixture obtained by mixing hard carbon (HC) as a negative electrode active material and zirconium oxide ($ZrO_2$) so as to be 0.49:0.01 (mass ratio) and polyvinylidene fluoride (PVdF) as a binder were weighed so as to be 95:5 (mass ratio). These were dispersed in N-methyl-2-pyrrolidone (NMP), and stirred at a 2000 rpm for 10 min. Thereby, a slurry-like negative electrode mixture (negative electrode mixture slurry) was obtained.

(Formation of the Negative Electrode Active Material Layer)

The obtained negative electrode mixture slurry was coated on an aluminum (Al) current collector foil using a 75 μm bar coater. The obtained coating film was dried, punched out into φ16 mm, and then molded by a press machine. Thereby, a negative electrode active material layer was formed on the Al Current collector foil.

(Production of Cell)

A 2032 type coin cell was produced using a laminate of an Al current collector foil and a negative electrode active material layer as a working electrode, metallic sodium (Na) as a counter electrode, three a material consisting of layers of 25 μm polypropylene/polyethylene/polypropylene (PP/PE/PP) as a separator, and $NaPF_6$EC:DMC=1:1 (volume ratio) of 1 M as an electrolytic solution.

<<Evaluation>>

<Evaluation of charge capacity and discharge capacity>

A charge-discharge test was conducted in an environment of 25° C. with a voltage range of 0.01 V-1.5 V and a current value of 0.1 C to evaluate Na insertion capacity (charge capacity) and Na desorption capacity (discharge capacity) of the coin cells.

Examples 2 to 4 and Comparative Examples 1 to 4

Cell were produced and evaluated in the same manner as in Example 1, except that the type of metal oxide (MO) and the ratio of a mass of the metal oxide relative to a total mass of the negative electrode active material and the metal oxide (MO/MO+HC), and the current value during charging and discharging in the above evaluation were changed as shown in Table 1.

<<Results>>

Table 1 shows charge capacity and discharge capacity, and charge-discharge efficiency (percentage of discharge capacity/charge capacity) of each example.

TABLE 1

| | | | current value: 0.1 C | | | current value: 0.3 C | | |
|---|---|---|---|---|---|---|---|---|
| | MO | MO/ (MO + HC) [wt %] | charge capacity [mAh/g] | discharge capacity [mAh/g] | charge-discharge efficiency [%] | charge capacity [mAb/g] | discharge capacity [mAh/g] | charge-discharge efficiency [%] |
| Comparative Example 1 | — | — | 326.0 | 273.0 | 83.7 | 189.1 | 154.0 | 81.5 |
| Example 1 | $ZrO_2$ | 5 | 371.4 | 266.3 | 71.7 | 257.1 | 211.1 | 82.1 |
| Example 2 | $ZrO_2$ | 3 | 355.8 | 265.3 | 74.6 | 277.9 | 227.0 | 81.7 |
| Example 3 | $ZrO_2$ | 10 | 383.3 | 352.2 | 91.9 | 283.3 | 237.8 | 83.9 |
| Example 4 | $ZrO_2$ | 20 | 343.8 | 280.0 | 81.5 | 302.5 | 247.7 | 81.9 |
| Comparative Example 2 | TiO | 10 | 326.7 | 266.7 | 81.6 | 272.2 | 223.3 | 82.0 |
| Comparative Example 3 | $Ti_2O_3$ | 10 | 432.2 | 235.6 | 54.5 | 323.3 | 222.2 | 68.7 |
| Comparative Example 4 | $TiO_2$ | 10 | 443.3 | 232.2 | 52.4 | 350.0 | 248.9 | 71.1 |

As shown in Table 1, when the current value was 0.1C, in the cells of Examples 3 and 4 in which the ratio of a mass of the zirconium oxide relative to a total mass of the hard carbon and the zirconium oxide was 10% by mass and 20% by mass, discharge capacity was larger than in the cell of Comparative Example 1 in which zirconium oxide was not added. Also, the cell of Example 3 had a higher charge-discharge efficiency than the cell of Comparative Example 1.

On the other hand, when the current value was 0.3C, in the cells of Examples 1 to 4 in which the ratio of a mass of the zirconium oxide relative to a total mass of the hard carbon and the zirconium oxide was 2% by mass to 20% by mass, charge-discharge capacity was larger and charge-discharge efficiency was higher than in the cell of Comparative Example 1 in which zirconium oxide was not added.

In addition, when the ratio of a mass of the metal oxide relative to a total mass of the hard carbon and the metal oxide was 10% by mass, in the cell of Example 3 using the zirconium oxide as the metal oxide, the charge-discharge efficiency was higher than in the cells of Comparative Examples 2 to 4 using the oxide of titanium, regardless of the magnitude of the current value.

REFERENCE SIGNS LIST

1 Sodium ion battery
10 Negative electrode current collector
20 Negative electrode active material layer
30 Separator
40 Positive electrode active material layer
50 Positive electrode current collector

The invention claimed is:

1. A sodium ion battery,
wherein the sodium ion battery comprises a negative electrode active material layer, and
wherein the negative electrode active material layer comprises a negative electrode mixture,
wherein the negative electrode mixture comprises a negative electrode active material and zirconium oxide,
wherein the negative electrode active material comprises hard carbon, and
wherein the sodium ion battery satisfies either condition (i) or condition (ii):
(i) the sodium ion battery is charged and discharged at a current value of 0.1C, and a ratio of a mass of the zirconium oxide relative to a total mass of the hard carbon and the zirconium oxide is 10% by mass or more and 20% by mass or less; or
(ii) the sodium ion battery is charged and discharged at a current value of 0.3C, and the ratio is 2% by mass or more and 20% by mass or less.

2. A method for manufacturing the sodium ion battery according to claim 1,
wherein the method for manufacturing the sodium ion battery comprises forming a negative electrode active material layer, and wherein the negative electrode active material layer comprises the negative electrode mixture.

3. A method according to claim 2, comprising forming the negative electrode active material layer by a method comprising the following steps:

providing a negative electrode mixture slurry comprising the negative electrode mixture and a dispersion medium; and applying the negative electrode mixture slurry to a base material, and drying and removing the dispersion medium.

4. The sodium ion battery according to claim 1, wherein the sodium ion battery satisfies condition (i).

5. The sodium ion battery according to claim 1, wherein the sodium ion battery satisfies condition (ii).

6. A method of charging and discharging a sodium ion battery, the method comprising:

charging and discharging the sodium ion battery at a current value, wherein the sodium ion battery comprises a negative electrode active material layer, wherein the negative electrode active material layer comprises a negative electrode mixture, wherein the negative electrode mixture comprises a negative electrode active material and zirconium oxide, wherein the negative electrode active material comprises hard carbon, and wherein either condition (i) or condition (ii) is satisfied:

(i) the current value is 0.1C, and a ratio of a mass of the zirconium oxide relative to a total mass of the hard carbon and the zirconium oxide is 10% by mass or more and 20% by mass or less; or (ii) the current value is 0.3C, and the ratio is 2% by mass or more and 20% by mass or less.

7. The method according to claim 6, wherein condition (i) is satisfied.

8. The method according to claim 6, wherein condition (ii) is satisfied.

* * * * *